United States Patent [19]

Piera

[11] Patent Number: 4,959,256
[45] Date of Patent: Sep. 25, 1990

[54] ENAMEL COATING CHARGED WITH GLASS BEADS FOR THE BOTTOM OF COOKING UTENSILS AND UTENSILS COATED IN THIS MANNER

[75] Inventor: Henri Piera, Annecy, France

[73] Assignee: SEB S.A., Selongey, France

[21] Appl. No.: 291,452

[22] Filed: Dec. 27, 1988

[30] Foreign Application Priority Data

Dec. 30, 1987 [FR] France ................ 87 18380
Dec. 30, 1987 [FR] France ................ 87 18381
Dec. 30, 1987 [FR] France ................ 87 18382

[51] Int. Cl.⁵ .................... B32B 19/04; B32B 17/06
[52] U.S. Cl. ................... 428/144; 220/456; 220/457; 220/458; 428/34.4; 428/34.5; 428/34.6; 428/149; 428/195; 428/209; 428/210; 428/212; 428/213; 428/220; 428/324; 428/363; 428/406; 428/426; 428/428; 428/432; 428/433; 428/469
[58] Field of Search ........... 428/34.6, 34.5, 34.4, 428/195, 206, 207, 208, 209, 210, 212, 213, 216, 220, 402, 403, 404, 406, 426, 428, 432, 433, 446, 450, 324, 325, 144, 141, 363, 433, 469, 149; 220/110, 456, 457, 458

[56] References Cited

U.S. PATENT DOCUMENTS

| | | | |
|---|---|---|---|
| 3,497,376 | 2/1970 | Weiser | 117/17 |
| 3,627,560 | 1/1969 | Morgan | 428/450 |
| 3,788,513 | 1/1974 | Racz | 428/156 |
| 3,922,458 | 11/1975 | Lynch | 428/34.6 |
| 4,043,824 | 8/1977 | Wager | 428/325 |
| 4,250,215 | 2/1982 | Mayer | 428/347 |
| 4,361,622 | 11/1982 | Theisen et al. | 428/363 |
| 4,591,530 | 5/1986 | Lui | 428/325 |
| 4,704,328 | 11/1987 | Imao et al. | 428/324 |

FOREIGN PATENT DOCUMENTS

| | | |
|---|---|---|
| 0200647 | 11/1986 | European Pat. Off. . |
| 2616168 | 10/1977 | Fed. Rep. of Germany . |
| 3507595 | 9/1986 | Fed. Rep. of Germany . |
| 2224557 | 10/1974 | France . |
| 2576038 | 7/1986 | France . |
| 2063246 | 6/1981 | United Kingdom . |
| 2138417 | 10/1984 | United Kingdom . |

OTHER PUBLICATIONS

"Abrasion by Lamellar Solid Lubricants", Ceramics, vol. 67, No. 4, July, 1967, 14535y, by J. Lancaster et al., page 1399.

Primary Examiner—Henry F. Epstein
Assistant Examiner—Archene A. Turner
Attorney, Agent, or Firm—Young & Thompson

[57] ABSTRACT

A cooking utensil having an enamel coating of a first enamel layer (7) covered in the zone of the bottom (1) of the utensil with a second enamel layer (3) which is in turn covered with a non-continuous third enamel layer (4) constituting a decoration and applied by screen process after drying of the first layer, these three layers (7, 3, 4) being obtained from an enamel frit and being fired simultaneously.

The two enamel layers (3, 4) contain glass beads (5, 6), at least a certain number of which have a diameter of greater value than the thickness of these enamel layers and project from the surface of the layers, a certain number of beads (6) of the non-continuous third layer (4) being applied on beads (5) of the second layer (3). The second layer also contains heat-conducting flakes.

The enamel coating offers enhanced resistance to wear and high thermal conductivity.

10 Claims, 1 Drawing Sheet

U.S. Patent  Sep. 25, 1990  4,959,256
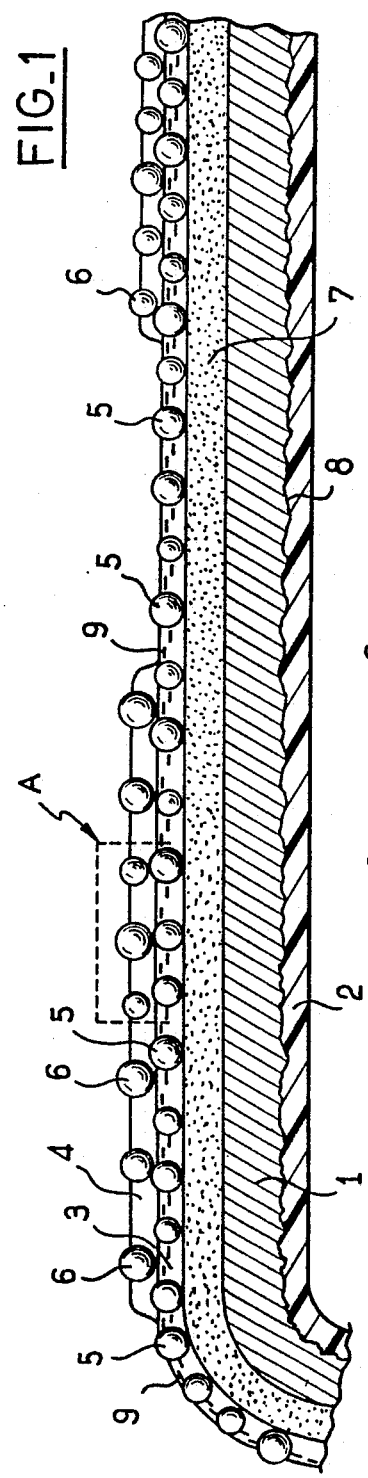
FIG_1
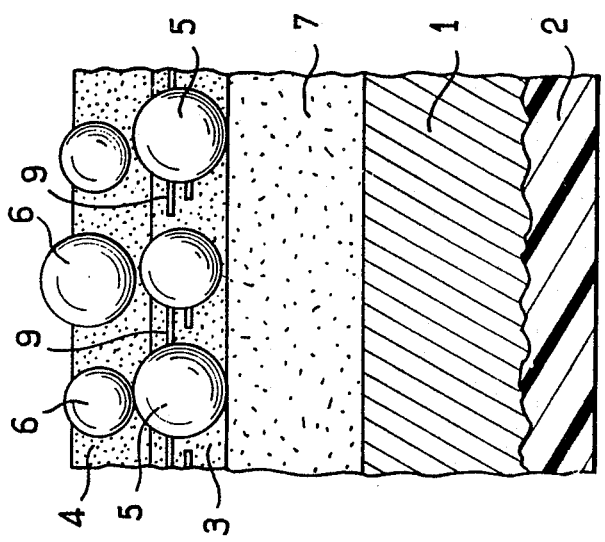
FIG_2

ENAMEL COATING CHARGED WITH GLASS BEADS FOR THE BOTTOM OF COOKING UTENSILS AND UTENSILS COATED IN THIS MANNER

BACKGROUND OF THE INVENTION

1. Field of the Invention

The present invention relates to an enamel coating for the bottom of a cooking utensil such as a frying pan, saucepan, shallow casserole or the like.

The invention is also directed to cooking utensils provided with an enamel coating of this type.

2. Description of the Prior Art

As disclosed in French patent No 2,544,338 in the name of the present Applicant, a known coating for the bottom of cooking utensils comprises a first enamel layer which completely covers the bottom of the utensil. On this layer is formed a second non-continuous layer of enamel constituting a decorative surface which is applied by screen process after drying of the first enamel layer. These two layers are obtained from an enamel frit and are fired simultaneously.

Simultaneous firing of the two enamel layers makes it possible to obtain exceptional adherence of the two layers and excellent resistance of these latter to the severe thermal shocks to which the enamel coating is exposed.

The non-continuous outer layer which constitutes a decoration makes it possible not only to improve the appearance of the bottom of the utensil but also constitutes a wearing layer which protects the underlying enamel layer against impacts and scoring. In fact, the raised surface of this decorative layer is capable of wearing without excessively impairing the attractive appearance of the enamel coating.

Nevertheless, by reason of the non-continuous character of said outer enamel layer, this layer wears too rapidly, especially when this enamel is obtained from an enamel frit for aluminum which is of distinctly lower hardness than enamels for utensils of steel or of cast-iron.

In order to provide a remedy for this relatively low hardness and to increase the resistance to wear of the outer enamel layer having a raised surface, the present Applicant has proposed in his French patent No. 2,544,338 to fill this enamel layer with hard particles having angular shapes such as alumina, silicon carbide and the like, some of which project from the surface of the enamel layer.

However, these hard and angular particles which project from the surface of the enamel considerably increase the coefficient of friction of this surface which is consequently difficult to clean. Furthermore, as they become worn, the particles give the raised-surface enamel decoration an unattractive appearance.

Moreover, by virtue of its insulating properties, the enamel coating affects the transmission of heat through the bottom of the cooking utensil.

The aim of the present invention is to overcome these disadvantages of the aforementioned enamel coating.

SUMMARY OF THE INVENTION

The invention is directed to an enamel coating for cooking utensils, comprising a first enamel layer covered in the zone of the bottom with a second enamel layer which is in turn covered with a non-continuous third enamel layer constituting a decoration and applied by screen process after drying of the first layer, these three layers being obtained from an enamel frit and being fired simultaneously.

In accordance with the invention, said enamel coating is distinguished by the fact that the second and third enamel layers contain glass beads, at least a certain number of which have a diameter of greater value than the thickness of said enamel layers and project from the surface of said layers, a certain number of beads of the non-continuous third layer being applied on beads of the second layer and that the second enamel layer contains heat-conducting flakes which are oriented in a direction parallel to each other and to the surface of said layer and partly overlap each other.

The glass beads which project from the surface of the non-continuous outer layer make it possible both to increase the resistance to wear of said outer layer and to reduce the coefficient of friction of this latter, with the result that said outer layer can readily be cleaned and is not liable to score sensitive surfaces.

Moreover, the present Applicant has found that, surprisingly, in spite of their smooth surface which is therefore unfavorable to anchoring of the glass beads in the enamel, said beads were securely anchored by virtue of the fact that the enamel of the non-continuous outer layer is applied by screen process. In practice, screen-process deposition consists in applying an enamel paste through the meshes of a screen by means of a squeegee which causes the beads to penetrate into the enamel layer.

In addition, this penetration of the beads into the non-continuous outer layer is controlled by the presence of glass beads in the subjacent enamel layer on which at least a certain number of beads of the outer enamel layer can be applied.

Furthermore, the glass beads which are present in the subjacent enamel layer make it possible to increase the resistance to wear and to facilitate cleaning of the parts of said layer which are not covered by the non-continuous outer layer.

The parallel orientation of the flakes is obtained under the action of the screen-process squeegee.

Said flakes are oriented in a direction parallel to the surface of the enamel layer and form within this latter a heat-conducting screen which ensures uniform heat distribution over the entire surface of the bottom of the utensil and considerably increases the transmission of heat through the enamel coating.

Thus the association of the aforesaid continuous second enamel layer and the aforesaid non-continuous third layer makes it possible to obtain an overall effect which could not be obtained with a single layer containing both beads and flakes.

In fact, the flakes could not be incorporated in the non-continuous third layer alone since in this case the adherence of said layer would be insufficient. Furthermore, the thermal properties would not be improved by reason of the non-continuous character of the layer. These properties are obtained only when the continuous second layer contains flakes.

Preferably, the second enamel layer is also applied by screen-process deposition, thus making it possible to control with precision the depth of penetration of the glass beads into said first enamel layer.

In a preferred embodiment of the invention, the maximum diameter of the beads is at most equal to twice the thickness of the enamel layers.

All the glass beads are thus engaged in the enamel layer to a depth which is at least equal to their diameter, thus ensuring excellent anchoring of said beads in the enamel layer.

In an advantageous embodiment of the invention, the diameter of the glass beads is within the range of 5 to 40 microns, the mean diameter of said beads being within the range of 15 to 20 microns.

The thickness of each enamel layer is within the range of 20 to 25 microns.

Preferably, each enamel layer contains between 5 and 20% by weight of glass beads.

Below 5% of glass beads, the effect of these latter on the properties of the enamel becomes negligible whereas, above 20%, cohesion between the beads and the enamel is impaired.

Preferably, the second enamel layer contains between 2 and 10% by weight of flakes.

Below 2% of flakes, the effect of these latter becomes negligible whereas, above 10%, the presence of these latter is liable to impair the cohesion of the enamel layer.

These flakes are preferably of mica coated with a thin layer of $TiO_2$ and/or $Fe_2O_3$. These latter have a coppery color, thus giving the enamel coating a very attractive appearance.

The second and third enamel layers advantageously contain solid particles of lamellar structure having lubricating properties such as talc, graphite, molybdenum disulfide, vanadium disulfide, boron nitride, etc. and their mixtures.

These particles of lamellar structure appreciably reduce the coefficient of friction of the enamel coating and thus considerably reduce the abrasive effect of the cooking plate on the utensil.

In the case of the non-continuous outer layer, these lubricating particles complete the action of the beads and take over from said beads when they are worn down to the surface of the layer.

BRIEF DESCRIPTION OF THE DRAWINGS

FIG. 1 is a fragmentary part-sectional view of the bottom of a cooking utensil provided with an enamel coating in accordance with the invention.

FIG. 2 is a view to a larger scale showing the detail A of FIG. 1.

DESCRIPTION OF THE PREFERRED EMBODIMENTS

In the accompanying drawings, there is shown the bottom 1 of aluminum, for example, of a cooking vessel having an internal surface (namely the surface which is in contact with food) which is covered with an anti-adhesive layer 2, for example of polytetrafluoroethylene.

The external surface of the bottom 1 is covered with an enamel coating in accordance with the invention and composed of three layers 7, 3 and 4. The first enamel layer 7 covers the entire external surface of the utensil whilst the two enamel layers 3 and 4 are applied solely in the zone of the bottom 1 of the utensil.

The three enamel layers 7, 3 and 4 are obtained from an enamel frit which is sinterable at a temperature of the order of 500 to 600 C., namely a temperature which is compatible with the melting point of aluminum.

The first layer 7 is applied by spraying from an aqueous slurry of enamel frit. The second enamel layer 3 as well as the third layer 4 which is non-continuous and constitutes a raised surface decoration are applied by screen-process deposition after drying of the first layer 7, and the three layers are fired simultaneously.

The two enamel layers 3, 4 contain glass beads 5, 6, at least a certain number of which have a diameter of greater value than the thickness of said enamel layers 3, 4 and project from the surface of these latter. It is also apparent from FIGS. 1 and 2 that at least a certain number of beads 6 of the outer layer 4 are applied against beads 5 of the second layer.

At the time of application by screen process, the paste containing the enamel frit and the beads 5 and 6 is pushed through the meshes of a screen by means of a squeegee which causes the beads 5, 6 to penetrate into their respective enamel layer. Thus the beads 5 of the second layer 3 bear on the surface of the first enamel layer 7 whilst the beads 6 of the third layer 4 bear on the beads 5 of the second layer 3.

The maximum diameter of the beads 5, 6 is at most equal to twice the thickness of the enamel layers 3, 4.

The diameter of said beads 5, 6 is preferably within the range of 5 to 40 microns, their mean diameter is within the range of 15 to 20 microns, whilst the thickness of each enamel layer 3, 4 is preferably within the range of 20 to 25 microns.

Thus at least a certain number of beads 5, 6 project from the surface of the enamel layers 3, 4. However, all the beads are engaged in the enamel to a depth which is at least equal to their diameter. The result thereby achieved is that the beads 5, 6 are perfectly anchored in the enamel.

Each enamel layer 3, 4 contains between 5 and 20% by weight of glass beads.

At the time of application of the third enamel layer 4, the beads 6 of this latter cannot penetrate into the second enamel layer 3 since the beads 5 contained in this latter limit the depth of penetration of the beads 6. The glass beads 6 of the outer enamel layer 4 enable this latter to afford resistance to wear while thus preserving the attractive appearance of the raised surface decoration formed by said layer 4.

Furthermore, by virtue of their smooth projecting surface, the beads 6 endow the enamel layer 4 with anti-adhesive properties which considerably facilitate cleaning of said layer.

In addition to the properties indicated earlier, the beads 5 protect against wear those portions of the enamel layer 3 which are not covered with the non-continuous layer 4 while facilitating cleaning of said portions.

In accordance with another important feature of the present invention, the second enamel layer 3 contains flakes 9 which are oriented in a direction parallel to each other and to the surface of said layer 3. Furthermore, they are placed in at least partially overlapping relation in much the same manner as roof tiles.

Said second enamel layer 3 contains between 2 and 10% by weight of particles 9. These flakes 9 are preferably constituted by mica strips covered with a thin layer of $TiO_2$ and/or $Fe_2O_3$, thus giving them a copper-like metallic appearance.

These flakes 9 have a length within the range of 10 to 70 microns and a mean thickness of the order of 2 microns. The parallel orientation of the flakes 9 is obtained under the action of the squeegee employed for applying the enamel layer 3.

Said flakes 9 have the effect:

on the one hand of increasing the thermal conductivity of the enamel coating and of ensuring uniform heat distribution over the entire surface of the bottom 1 of the utensil and on the other hand of increasing the resistance to staining of the enamel layer 3; in fact, the screen formed by the flakes 9 masks the impurities which could have infiltrated into the pores of the enamel layer 3.

The two enamel layers 3, 4 preferably contain in addition solid particles of lamellar structure having lubricating properties such as talc, graphite, molybdenum disulfide, vanadium disulfide, boron nitride, etc. and their mixtures.

These lubricating particles facilitate the application of the enamel layers 3, 4 by screen process and increase the anti-adhesive properties of these latter.

One example of practical application of the enamel coating in accordance with the invention is given hereinafter.

An enamel frit slurry is sprayed onto the outer surface of the utensil in order to form the first layer 7. After drying of this first layer 7, a second enamel layer 3 is applied by screen-process deposition on said first layer in the zone of the bottom 1, said second layer being in the form of an oily paste which contains:

(a) 100 parts by weight of an enamel frit for aluminum containing, for example:

34% $SiO_2$
20% $Na_2O$
10% $K_2O$
2% $Li_2O$
20% $TiO_2$
2% $Al_2O_3$
2% $P_2O_5$
10% $V_2O_5$ (b) 0 to 5 parts of mineral pigments which withstand a temperature at least equal to 600° C.

(c) 2 to 10 parts of mica flakes coated with $TiO_2$ and $Fe_2O_3$ and having a length within the range of 10 to 70 microns, (d) 5 to 20 parts of glass beads having a diameter within the range of 5 to 40 microns, their mean diameter being within the range of 15 to 20 microns, (e) 25 to 45 parts of pine oil, (f) 2 to 10 parts of talc, graphite or molybdenum disulfide.

This layer is dried. After drying, the dry enamel biscuit thus obtained has a thickness of the order of 25 to 30 microns.

On this enamel biscuit is applied by screen process a non-continuous third enamel layer having the same composition as the second layer but not provided with flakes.

The three enamel layers thus obtained are fired simultaneously at a temperature of the order of 550° C.

The enamel coating thus obtained has excellent resistance to thermal shocks (heating to 400° C. followed by immersion in cold water).

What is claimed is:

1. A cooking utensil having a bottom (1) entirely covered by a first enamel layer (7) which supports a second continuous enamel layer which in turn supports a second continuous enamel layer (3) which supports a non-continuous third enamel layer (4) constituting a raised surface decoration and applied by screen process after drying of the first layer, these three layers (7, 3, 4) being obtained from an enamel frit and being fired simultaneously, wherein the second and third enamel layers (3, 4) contain glass beads (5, 6), at least a certain number of which have a diameter of greater value than the thickness of said enamel layers and project from the surface of said layers, a certain number of beads (6) of the non-continuous third layer (4) being applied on beads (5) of the second layer (3) and wherein the second enamel layer (3) contains mica flakes (9) which are covered with a member selected from the group consisting of $TiO_2$, $Fe_2O_3$ and a mixture thereof and which are oriented in a direction parallel to each other and to the surface of said layer and partly overlap each other, said third layer being free from said flakes.

2. Cooking utensil according to claim 1, wherein the second and third layers (3, 4) are applied by screen process.

3. Cooking utensil according to claim 1, wherein the maximum diameter of the beads (5, 6) is at most equal to twice the thickness of the enamel layers (3, 4).

4. Cooking utensil according to claim 1, wherein the diameter of the glass beads (5, 6) is within the range of 5 to 40 microns, the mean diameter of said beads being within the range of 15 to 20 microns.

5. Cooking utensil according to claim 4, wherein the thickness of the second and third enamel layers (3, 4) is within the range of 20 to 25 microns.

6. Cooking utensil according to claim 1, wherein each enamel layer (3, 4) contains between 5 and 20% by weight of glass beads.

7. Cooking untensil according to claim 1, wherein the second enamel layer (3) contains between 2 and 10% by weight of flakes (9).

8. Cooking untensil according to claim 1, wherein the flakes (9) have a length within the range of 10 to 70 microns and a mean thickness of the order of 2 microns.

9. Cooking untensil according to claim 1, wherein the two enamel layers (3, 4) contain solid particles of lamellar structure having lubricating properties.

10. Cooking untensil according to claim 9, wherein the solid particles of lamellar structure are selected from the following compounds: talc, graphite, molybdenum disulfide, vanadium disulfide, boron nitride and their mixtures.

* * * * *